(12) United States Patent
Butte et al.

(10) Patent No.: US 11,205,130 B2
(45) Date of Patent: Dec. 21, 2021

(54) MENTAL MODELING METHOD AND SYSTEM

(71) Applicant: Decision Partners, LLC, Pittsburgh, PA (US)

(72) Inventors: Gordon Butte, Sarasota, FL (US); Sarah Thorne, Ontario (CA); Baruch Fischhoff, Pittsburgh, PA (US)

(73) Assignee: Decision Partners, LLC, Pittsburgh, PA (US)

(*) Notice: Subject to any disclaimer, the term of this patent is extended or adjusted under 35 U.S.C. 154(b) by 740 days.

(21) Appl. No.: 14/989,251

(22) Filed: Jan. 6, 2016

(65) Prior Publication Data

US 2016/0196495 A1 Jul. 7, 2016

Related U.S. Application Data

(63) Continuation of application No. 14/014,486, filed on Aug. 30, 2013, now Pat. No. 9,262,725.

(60) Provisional application No. 61/695,545, filed on Aug. 31, 2012.

(51) Int. Cl.
*G06N 5/04* (2006.01)
*G06N 20/00* (2019.01)

(52) U.S. Cl.
CPC .............. *G06N 5/043* (2013.01); *G06N 20/00* (2019.01)

(58) Field of Classification Search
CPC .......... G06N 5/043; G06N 5/04; G06N 20/00; G06F 17/30705; G06F 17/30731
See application file for complete search history.

(56) References Cited

U.S. PATENT DOCUMENTS

| 5,715,468 | A  | * | 2/1998  | Budzinski | G06F 16/36 |
| | | | | | 704/9 |
| 7,970,759 | B2 | * | 6/2011  | Friedlander | G06F 16/2457 |
| | | | | | 707/723 |
| 2005/0131848 | A1 | * | 6/2005  | Chickering | G06N 7/005 |
| | | | | | 706/12 |
| 2005/0234740 | A1 | * | 10/2005 | Krishnan | G06Q 10/06398 |
| | | | | | 705/2 |
| 2009/0228425 | A1 | | 9/2009  | Goraya | |
| 2010/0228693 | A1 | | 9/2010  | Dawson | |
| 2012/0239671 | A1 | * | 9/2012  | Chaudhri | G16H 20/00 |
| | | | | | 707/756 |
| 2012/0330869 | A1 | | 12/2012 | Durham | |
| 2013/0022947 | A1 | * | 1/2013  | Muniz Simas | G09B 19/00 |
| | | | | | 434/236 |

OTHER PUBLICATIONS

Morgan et al., "A Mental Models Approach", Cambridge University Press (2002), pp. 34-62.

(Continued)

*Primary Examiner* — Li Wu Chang
(74) *Attorney, Agent, or Firm* — The Webb Law Firm

(57) ABSTRACT

A mental modeling method and system may include providing at least one expert model, the at least one expert model including an analytical framework that summarizes subject matter expert-level knowledge. At least one mental model of at least one individual that summarizes subject matter individual-level knowledge is provided. The at least one expert model is modified based on the at least one mental model to provide at least one updated expert model.

17 Claims, 12 Drawing Sheets

(56) References Cited

OTHER PUBLICATIONS

Downs et al., "Chapter 8: Qualitative Information", Communicating Risks and Benefits: An Evidence Based User's Guide, Food & Drug Administration, U.S. Dept. of Health and Human Services, (Aug. 2011). pp. 65-75.
Bosma, "Mental Models of the General Dutch Public Concerning MRSA", Master Thesis, Communication Studies (Dec. 2007), University of Twente, Enschede, The Netherlands, pp. 1-82.
Bostrom et al., "Characterizing Mental Models of Hazardous Processes: A Methodology and an Application to Radon", Journal of Social Issues, vol., No. 4, (1992), pp. 85-100.
Gilmour et al., "Using Stakeholder Mapping and Analysis with a Mental Models Approach for Biosecurity Risk Communication with Peri-Urban Communities", ACERA Project No. 08/01, The University of Melbourne, Australia, pp. 2-68.
Linkov et al., "Cognitive Barriers in Floods Risk Perception and Management: A Mental Modeling Framework and Illustrative Example", IEEE Int'l. Conf. on Systems, Man, and Cybernetics, (2009), pp. 3940-3945.
Aamodt et al., "Case-Based Reasoning: Foundational Issues, Methodological Variations, and System Approaches", AI Communications, IOS Press, (Mar. 1994), vol. 7, pp. 39-59.
Lee et al., "Case-Based Decision Class Analysis For Building A Decision Model: Onion", APDSI, 2004, pp. 1-15.

* cited by examiner

MENTAL MODELING METHOD AND SYSTEM

CROSS REFERENCE TO RELATED APPLICATIONS

This application is continuation of U.S. patent application Ser. No. 14/014,486, filed Aug. 30, 2013, which claims benefit of priority from U.S. Provisional Patent Application No. 61/695,545, filed Aug. 31, 2012, the disclosures of which are hereby incorporated in their entirety by reference.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

1. Field of the Invention

Preferred and non-limiting embodiments are related to a mental modeling method and system and, in particular, to a mental modeling method and system for producing communications that effectively address mental models.

2. Description of Related Art

People are complicated and their thinking is unpredictable. Judging a balance of benefits and risks in order to take well-informed and appropriate action is a complex psychological process that cannot be "guessed at." Communication affects how people perceive benefits and risks, tradeoffs, opportunities, and challenges. By understanding in-depth, people's mental models and their key components, analysts can focus individual judgment, decision making, and behavior on selected topics using specialized communications formulated from and tailored to them. Analysts can do so with different sets of stakeholders on any topic anywhere in the world.

Mental models have been studied by cognitive scientists since the 1930's. Decades of research demonstrate that people's judgments about complex issues are guided by mental models which cannot be determined without the appropriate empirical research. Mental models have been described by scientists as tacit webs of belief that all people draw upon to interpret and make inferences about issues that come to their attention through communications of all kinds. A person's "mental model" can be thought of as a complex web of deeply held beliefs that operate below the conscious level. Mental models affect how an individual defines a problem, reacts to issues, and makes decisions about messages and options concerning topics that come to his or her attention through communications. Mental models tend to prevent people from seeing alternative perspectives and define boundaries of thought and action, thereby limiting people to familiar patterns of reasoning and action. Effective analyses of mental models can identify how different groups of people think about and respond to a variety of topics, including benefits and risks associated with activities, plans, or proposals.

SUMMARY OF THE INVENTION

Generally, provided is a mental modeling method and system that addresses or overcomes some or all of the deficiencies and drawbacks associated with existing knowledge and information modeling methods and systems for purposes of addressing the complex psychological processes of judgment, decision making, and behavior using communications of all kinds. An expert models/mental models approach to address challenges presented by lay-people's understanding of complex issues and processes, such as making key decisions and understanding and managing probability, is provided by a mental modeling method and system according to example embodiments. To change people's beliefs and behaviors, one must understand and change their mental models. Mental models can be addressed through communications in order to better inform people's decision making and sustainably change key attitudes, beliefs, and behaviors. Mental models must be addressed through precisely targeted strategies and communications that are tailored to the key decisions confronting people.

Preferably, provided is a mental modeling method and system that provides a faster, more efficient modeling process. Preferably, provided is a mental modeling method and system that creates data-rich functional models for more useful and consistent application within and across an organization. Preferably, provided is a mental modeling method and system that enables linking of models, merging of models, and embedding information and data within the functional models in various forms including multimedia forms. Preferably, provided is a mental modeling method and system that provides a structure for mental models that is based at least partly on a knowledge/current understanding component, a knowledge gaps (consequential) component, a misunderstandings (consequential) component, a priorities component, and a trust and competence criteria component.

According to a preferred and non-limiting embodiment, a mental modeling method includes providing, by a processor, at least one expert model, the at least one expert model including an analytical framework that summarizes subject matter expert-level knowledge. The processor may provide at least one mental model of at least one individual that summarizes subject matter individual-level knowledge. The processor may modify the at least one expert model based on the at least one mental model to provide at least one updated expert model.

The processor may receive unstructured data and provide at least one coding guide for coding the unstructured data to create structured data.

The processor may data mine the unstructured data and/or the structured data based on at least one predetermined algorithm to automatically create at least one concept map.

The processor may provide at least one stakeholder map based on the at least one concept map.

The expert model may be based at least partly on the unstructured data, the structured data, and the at least one concept map.

The processor may analyze the structured data to create the at least one mental model.

The analyzing may include providing the at least one mental model based on at least one of the following: a knowledge and understanding of the at least one individual, a gap in the knowledge and understanding of the at least one individual, a misunderstanding of the at least on individual, at least one priority of the at least one individual, a credibility of at least one communications source to the at least one individual, or any combination thereof.

The updated expert model may include at least one influence diagram.

The processor may link the at least one updated expert model with a plurality of different models.

According to another preferred and non-limiting embodiment, a mental modeling system may include a computing device connected to at least one network, wherein the computing device is configured to: acquire, from at least one input, unstructured data; provide at least one expert model, the at least one expert model including an analytical framework that summarizes subject matter expert-level knowledge; provide at least one mental model of at least one individual that summarizes subject matter individual-level knowledge; and modify the at least one expert model based on the at least one mental model to provide at least one updated expert model.

The computing device may be configured to provide at least one coding guide for coding the unstructured data to create structured data.

The computing device may be configured to data mine the unstructured data and/or the structured data based on at least one predetermined algorithm to automatically create at least one concept map.

The computing device may be configured to provide at least one stakeholder map based on the at least one concept map.

The expert model may be based at least partly on the unstructured data, the structured data, and the at least one concept map.

The computing device may be configured to analyze the structured data to create the at least one mental model.

The computing device may be configured to provide the at least one mental model based on at least one of the following: a knowledge and understanding of the at least one individual, a gap in the knowledge and understanding of the at least one individual, a misunderstanding of the at least one individual, at least one priority of the at least one individual, a credibility of at least one communications source to the at least one individual, or any combination thereof.

The updated expert model may include at least one influence diagram.

The computing device may be configured to link the at least one updated expert model with a plurality of different models.

According to still another preferred and non-limiting embodiment, a computer program stored on a computer memory and executing on a processor which, when used on a computer apparatus causes the processor to execute steps of a mental modeling method, may provide at least one expert model, the at least one expert model including an analytical framework that summarizes subject matter expert-level knowledge; provide at least one mental model of at least one individual that summarizes subject matter individual-level knowledge; and modify the at least one expert model based on the at least one mental model to provide at least one updated expert model.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Further features and other objects and advantages will become apparent from the following detailed description made with reference to the drawings in which.

DETAILED DESCRIPTION OF THE PREFERRED EMBODIMENTS

Figure 1A:
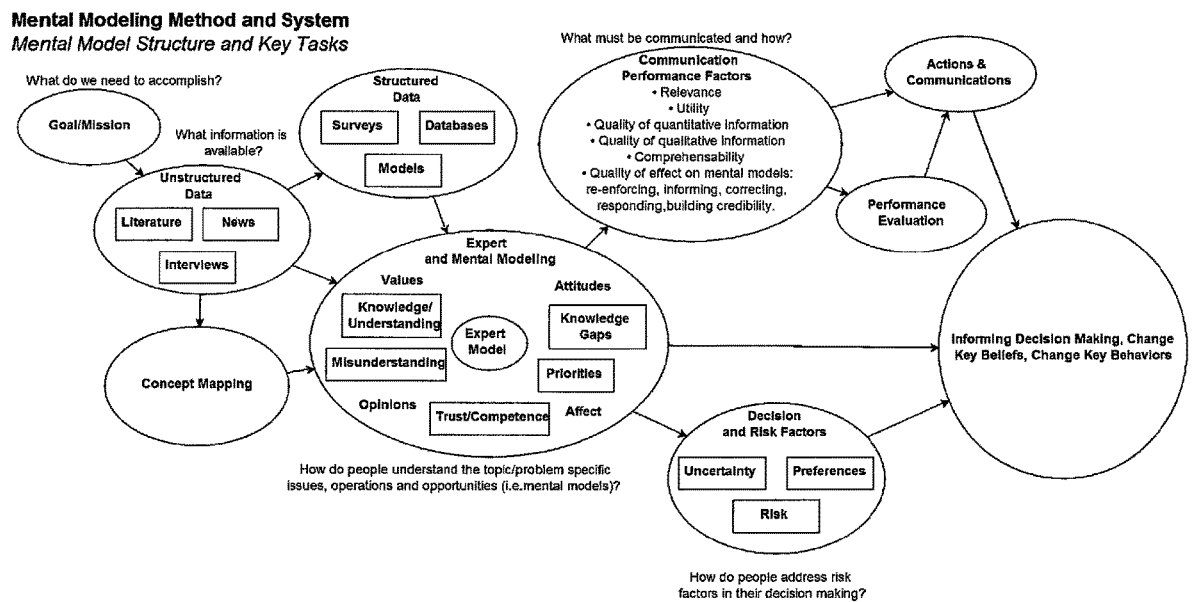
FIG. 1A is a flow chart showing a mental modeling method and system according to a preferred and non-limiting embodiment of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt or transfer of one or more signals, messages, commands, or other type of data. For one unit- or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, routed, and the like, between the first and second unit or component. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

A simple model of persuasive communication envisions people receiving expert advice and following the received advice as instructed. A simple model of non-persuasive communication envisions people receiving authoritative information that is relevant and useful for decision making purposes and using the received information to make independent decisions. For either simple model of communication to work, people must accept the content of the communications without further explanation.

At times, however, people want to know why communications make their claims. That is, people need qualitative information about the processes at play or in which they are involved that create the risks and benefits that their actions might bring—whether they follow a recommendation or make the choice on their own. One reason why qualitative information is needed is to evaluate claims by seeing the evidence supporting the claims. A second reason is to master a topic to be able to act more effectively, adapt to changing circumstances, and make sense of competing claims. A third reason is to have a warranted feeling of self-efficacy, which comes with understanding one's environment. A fourth reason is to receive the respect that comes with being offered an explanation, rather than being expected to accept claims on faith.

Creating communications for qualitative information follows some similar steps as creating communications for quantitative information. Identify the most relevant information, determine stakeholders or audience members' current beliefs, draft messages focused on critical gaps, evaluate the drafts, revise the drafts as needed, and assess the resulting communication's adequacy, relative to the demands placed on the communication. An added burden on qualitative communications is that recipients must be able to integrate the new information with their existing beliefs. Unless the recipients can create a coherent mental model from all they have learned, the new information will confuse, rather than inform them.

More specifically, a process for creating communications for qualitative information determines what information people need to know if they are to understand the processes creating the risks and benefits that could follow from their decisions; characterizes their current beliefs in terms that enable comparing them with the analysis of what they need to know; and designs, evaluates, refines, and re-evaluates communications that seek to bridge critical knowledge gaps. If successful, qualitative communications leave recipients with a warranted sense of having mastered the relevant aspects of a topic, enabling them to make effective decisions on their own and evaluate recommendations made by others.

A goal of communication is not to achieve general mastery of a domain, as measured by tests of financial, health, or climate literacy but, rather, to ensure that people know the facts germane to specific decisions, building on their existing mental models. Depending on the decision and their prior knowledge, people may need to learn a little or a lot. One task for communication content is thus to help people make sense of what communications, or messages, they are receiving and integrate them into their existing mental models, typically using a non-persuasive approach. Non-persuasive communications avoid the use of spin and recommendations and perform more in a decision support or enabling mode for audiences or stakeholders.

A mental modeling system according to preferred and non-limiting embodiments may comprise the following functional modules or components for producing communications that effectively address mental models: an expert modeling component; a mental models research component; and a preparation component for preparing of testable prototypical strategies and communications in the form of text, graphical representations, multimedia representations, e.g., animation, and interactive representations, e.g., navigation. A mental modeling method according to preferred and non-limiting embodiments may comprise an expert modeling process; a mental models research process; and a preparation process for preparing of testable prototypical strategies and communications in the form of text and graphical representations.

The expert modeling component or process creates an analytical framework, i.e., an expert model that summarizes subject matter expert-level knowledge and establishes the mental models research framework in terms of hypotheses about stakeholders' decision-making processes. If initiatives and communications are to be well informed and authoritative, they must reflect current understanding among the experts in relevant fields. Experts may include managers in various functions and at different levels in organizations. Experts may also include subject matter experts across a wide range of fields. Accordingly, one step in organizing initiatives or determining the content and focus of communications is integrating the knowledge of experts in a way that can be focused and managed over time.

When chosen for their expertise, an expert is likely to know much more than most other people need to know in order to make judgments about a topic at hand. Some expert knowledge is likely to be arcane. Some expert knowledge may simply be irrelevant to critical decisions people are facing. Often times, expert knowledge can be too detailed, or peripheral, to be useful in guiding initiative and communication development. To be effective, the expert modeling component or process encourages and enables participants to think systematically about their knowledge, that of others, and the system in which the knowledge must be applied. The expert modeling component or process stimulates experts to look at what they know in new ways. The expert modeling component or process enables collection and integration of expert-level knowledge into a functional model enabling more efficient communication of that knowledge while also carefully focusing experts' knowledge and knowledge sharing activity. Since the expert modeling component or process compels close collaboration, expert modeling experiences can build positive relationships among participants and long-lasting coalitions. Each expert modeling session produces a model and relationships with staying power, i.e., an expert model that can be used by many different people in different ways and adapted far into the future on the topic as new issues arise or new information becomes available.

In a mental modeling method and system according to a preferred and non-limiting embodiment, directed graphs of varying kinds may be used to depict various kinds of models, e.g., expert models and mental models. For example, influence diagrams may be used to depict expert models and mental models. An influence diagram describes a system of variables (nodes) and their relationship (connection) and influence on mental models and outcomes for judgment, decision making, and behavior. In such graphs, an arrow or connector between two nodes indicates that the node at the arrow's tail exerts some influence on the node at the arrow's head. Knowing the value or weight of one node helps predict the same for another node. For example, an influence diagram of the weather might include an arrow from an oval representing sunshine to an oval representing air temperature, because sunshine is a factor that influences air temperature. That is, knowing how sunny it is or will be helps in predicting the temperature. Influence diagrams allow effective communication among experts and between experts and non-experts; ensure no critical knowledge is missed or overlooked; allow a mutually respectful way for communicators and technical experts to ensure they understand one another; ensure only decision-relevant information is included; can be applied to virtually any situation; are compatible with expert's conventional way of thinking; make communication with non-experts more tractable to skeptical experts by decomposing the task into manageable pieces; fit with a decision-making perspective; provide a strong, flexible framework for obtaining systematic assistance from experts as well as documenting the assumptions underlying information; and can be readily subjected to peer review. To critical expert knowledge into an influence diagram, the process works from a simple model to more detailed versions. The process is iterative as experts review one another's work and reflect on their own work.

Figure 4:
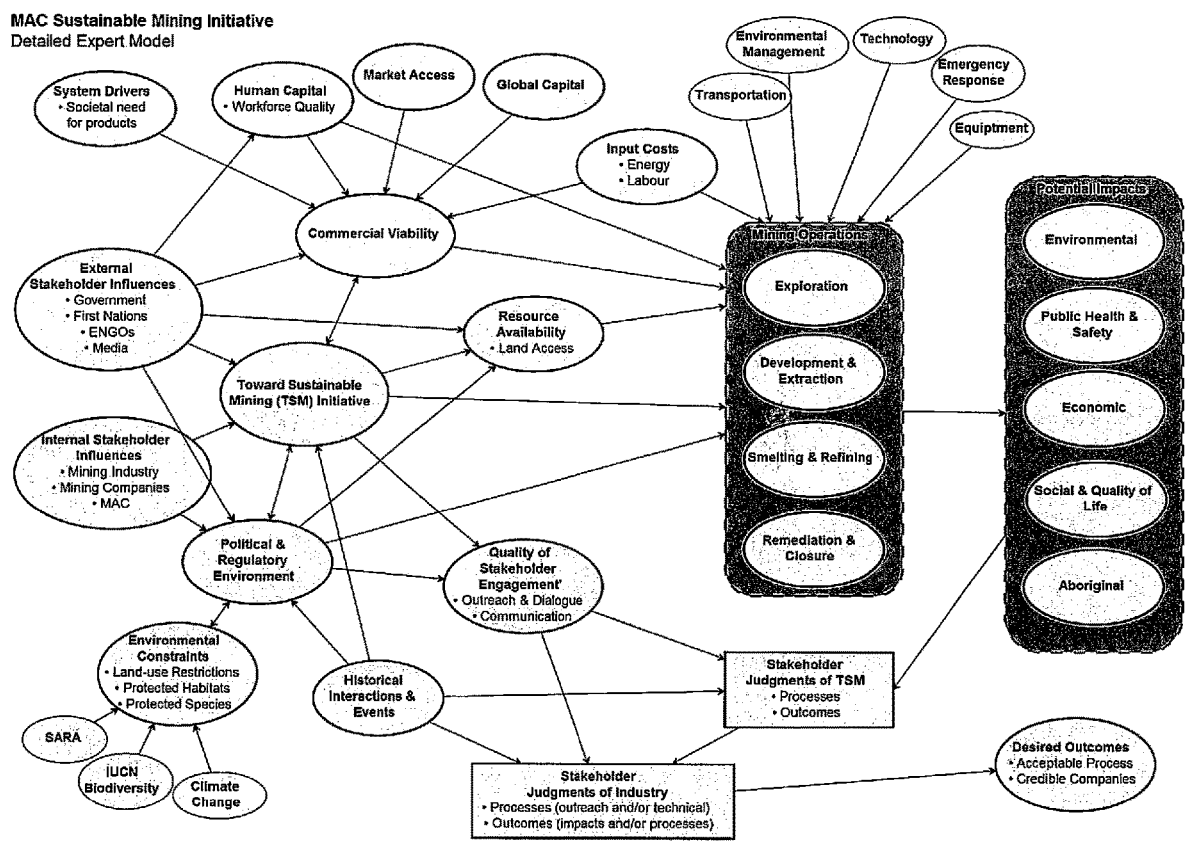
FIG. 4 illustrates an example expert model.

As shown in FIG. 4, an expert model may comprise an influence diagram illustrating an overall system. The influence diagram summarizes technical knowledge about a topic and illustrates inputs and outputs determining and defining the system's performance. For example, each node (oval) in FIG. 4 represents a variable (or vector of variables, measuring different aspects of a common factor) of the expert model, and an arrow between two nodes indicates that knowing the value of the node at the arrow's tail helps in predicting the value of the variable at its head. The term influence diagram thus reflects the fact that beliefs about the former variable influence beliefs about the latter. There may also be a causal relationship between linked variables, or there may simply be an informational link. A simple expert model outlines primary relationships. A Detailed Expert Model, as shown in FIG. 4, depicts a next level of variables and influences and, if applicable, elaborates on specific topics. An expert model may be defined in terms that are compatible with creating a computational version, capable of estimating impacts. With such a complicated system, the data demands of such computations are very large. However, the discipline of ensuring compatibility of that goal gives the model its rigor.

The mental models research component or process is based at least partially on the analytical framework, i.e., the expert model, and reveals, characterizes in-depth and presents visualizations of mental models. The mental models research component or process comprises qualitative and quantitative research processes or instruments.

The mental models research component or process comprises performance of individual, one-on-one interviews, leading participants through a jointly determined agenda of topics. The one-on-one situation helps to approximate the decision-making environment within which most people form their attitudes toward an organization or industry. The method allows free expression and encourages elaboration on topics in order to reveal individual perspectives at considerable depth. Interviewees can readily raise topics that most interest them, but which may be outside of specific questions. Because a full set of beliefs is elicited from each interviewee, structured analyses of interview results can be performed by the mental models research component or process. Analysts may identify at least five major components of a mental model summarized generally as what people believe and why they believe it, as well as compare analyses over time and provide insights into why beliefs may have changed, on the topics at hand. The mental models research component or process produces richer results more efficiently than can the equivalent time and effort invested in other interview research instruments such as opinion polls or focus groups. Twinned with a structured approach to developing an interview sample, the mental models research component or process also characterizes communication networks in communities where it is applied. The mental models research component or process may be used effectively in combination with opinion surveys and focus groups and, in such cases, the mental models research is performed first in order to design properly constituted focus groups and opinion research instruments. Moreover, a process of conducting mental models research is a respectful one. Interviewers themselves often begin to create relationships with participants. Mental models research has demonstrated that even participants who are skeptical of a company or industry often express satisfaction with a process that allows both parties to hear one another out.

Accordingly, the mental models research component or process leads an individual through an agenda of topics, allowing free expression and encouraging elaboration on topics, in order to reveal individual perspectives at depth. Structured analyses are performed by the mental models research component or process, in data form, a full set of beliefs that is elicited from each respondent. The structured analyses comprise the coding of interview transcripts, automatic analyses of coded data, and production of various types of reports including a statistical summary of beliefs and visualizations of mental models. Analysts are thus able to identify what people believe and why they believe it.

From mental models research results, properly constituted group discussion and opinion polling may be formulated and deployed to identify additional elements of mental models and their prevalence across large populations. Group discussion, often called a "focus group", leads a small set of individuals together through an agenda of topics, formulated in a general way to allow free expression, within the constraints of group dynamics. Opinions are often interpreted and summarized impressionistically. One challenge this method presents is the need to sort out group influences and lines of thought that could not be pursued fully by the individuals. Opinion polling poses a fixed set of structured questions on an individual basis to a large number of people. Answers are directly subjected to statistical analyses, with no intervening interpretation. The results of these analyses are interpreted in terms of how respondents understood the questions and might have responded to alternative interpretations. Opinion polling typically reflects what people believe, not why they believe it. A mental modeling method and system according to preferred and non-limiting embodiments may comprise any of the mental models research, group discussion, and opinion polling functions or components, as well as analysis thereof. For example, if individuals' decisions are formulated and expressed in group settings, then appropriately constituted focus groups are possible. Often, a structured survey can be built upon open-ended procedures, in order to collect larger sets of data.

With fixed resources, a mental modeling method and system according to preferred and non-limiting embodiments may analyze fewer mental models interviews than structured surveys. As a result, the prevalence of particular beliefs may be estimated with less precision. However, many practical decisions do not require great precision. Rather, only beliefs that are held with any great frequency in the target population may need to be known. For example, resulting actions may not be different if the rate is 30% or 50%; either rate addressing the concern. In general, a sample size for mental models research should depend on the precision-required. A sample of about 30 people may provide a desired chance of eliciting any belief held by as few as 5% of the population and a reasonable margin of error around frequency estimates: Benefits of such small sample sizes also include: showing that at least some people in that community have been consulted; determining if the general framing of the issue makes sense, and whether a larger sample would be worth undertaking (i.e., are people willing to talk); and looking at variables that recur across subpopulations, if interactions are ignored. For example, there might be 20 women and 20 men spread across sample populations. If one assumes that gender has the same effects in all stakeholder groups, then one has a reasonable sample of men and women.

Benefits from the best of both methods may be achieved if the mental models interviews are followed with structured surveys based on results of mental models research. The structured surveys may be administered to many people, with questions that take advantage of knowing what to ask about and how to ask about it. The structured surveys provide less rich results than mental models interviews. However, much less quality is sacrificed in the course of gaining greater quantity as compared to a structured survey conducted without the benefit of systematic mental models work. One exception to this rule arises when the communication act of a mental models interview is so important that it should not be supplanted by the more impersonal structured survey.

Communications in the form of text, graphical, audio, and other multimedia representations are produced based on an expert model updated, modified, or informed by mental models research results (data) which has been produced by the mental models research component or process and the preparation component and/or process so that the communications effectively influence mental models, for example, by informing the mental models in such a way as to complete or correct them relative to, and in better alignment with, expert-level knowledge.

Figure 1B:
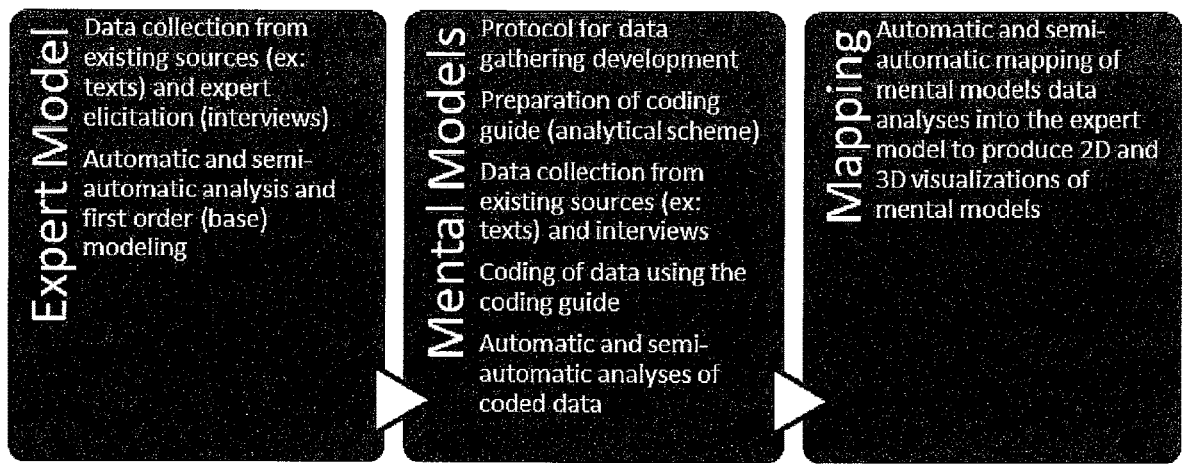
FIG. 1B is a flow chart of a mental modeling method according to a preferred and non-limiting embodiment.

FIG. 1A is a flow chart showing a mental modeling method and system according to a preferred and non-limiting embodiment of the present invention. FIG. 1B is a flow chart of a mental modeling method according to a preferred and non-limiting embodiment. A mental modeling method and system according to a preferred and non-limiting embodiment comprises one or more software modules that enable functions and/or components of the mental modeling method and system to be completed more accurately and efficiently. The mental modeling system comprises an expert modeling function or component; an analysis function or component for analyzing mental models research data; a reporting function or component for reporting mental models research data against the expert model to create visualizations of mental models; and a preparation function or component for preparing prototypical strategy and communications in model form.

A software module, e.g., a Cognitive Analysis Software Suite (CASS), provides a management process configured to provide the mental modeling method and system based on drivers and outcomes. For example, the CASS provides a series of functions that support and/or enable performance of tasks within the management process for mental modeling. More detail on the CASS providing a mental modeling method and system according to a preferred and non-limiting embodiment is described in Appendix A.

APPENDIX A

Contents

| PAGE | DESCRIPTION |
|---|---|
| 1 | Mental Modeling Technology |
| 2-33 | cCASS Training Session 1 - cCASS Basics |
| 34 | Com.cass.ccass.project |
| 35 | Com.cass.core |
| 36 | Com.cass.ecass.mining |
| 37 | Com.cass.ecass.project |
| 38-46 | Diagrams |
| 47-77 | eCASS Cognitive Analysis Software Suite User Guide |
| 78 | Mental Models 3D |
| 79 | WERF Stakeholder Map |
| 80-84 | Background - Current Status of eCASS |
| 85-89 | Mental Modeling Technology Method and System Description |

Mental models research typically identifies many more concepts than can be effectively conveyed in most communication modes. Research also allows documentation of people's current mental images (e.g., pictures), vocabulary, processes (e.g., causal chains), and beliefs and their underlying rationale. Given all this information as raw material for communication, one stage in developing strategy and communications for addressing people's mental models is to set priorities for each.

With a fully computational expert model and a full set of parameter estimates, the impact of providing different pieces of missing (in current mental models) information may be computed. For example, the percentage of people whose decisions would change as a result of providing each piece of information may be computed. More heuristic methods may be used. However the logic is the same, communications focus on the information that has the greatest impact on the greatest portion of the audience or stakeholders and is relevant and useful to them for decision making purposes.

An individual's mental model may comprise a knowledge/current understanding component, a knowledge gaps (consequential) component, a misunderstandings (consequential) component, a priorities component, and a trust and competence criteria component.

Using an expert model as an analytical framework, various analyses of coded unstructured data, such as interview results, are conducted to reveal and characterize in-depth the make-up of a mental model as well as the content of each component of the mental model. Analyses can also be conducted to identify values, opinions, attitudes and emotion (affect). This combination of make-up and content is mapped against or onto the expert model resulting in two-dimensional or three-dimensional colorized visualizations of the mental model.

As described in more detail in Appendix A, an eCASS module of the CASS software module provides model drawing, stakeholder maps, a navigation mode, and data mining functions or components, and a cCASS module of the CASS software module provides functions or components for coding of qualitative and quantitative data and analysis of the coded data. The cCASS module and eCASS module interface with each other in the CASS software module such that the CASS is configured to perform a mental modeling method as shown in FIG. 1B. The CASS is configured to create an expert model, create a coding guide based on the expert model, collect data about mental models, code the data, analyze the coded data, produce visualizations of mental models, modify the expert model based on the analyzed data to create a updated expert mental model, and create communications intended to influence (complete and correct) the mental models of target groups or audiences.

A model comprises nodes (instances of variables) and connectors (instances of relationships). Each node has assigned properties. The properties may include color, shape, size, etc., and the properties of each node may be predetermined by a library or changed by a user of the modeling system. Each connector provides a connection between two different nodes. Models may be created from templates stored in a library of the mental modeling system or from scratch by a user.

A first step in a mental modeling method according to a preferred and non-limiting embodiment is to determine a goal or mission, i.e., what are the mental modeling and/or communications intended to accomplish.

The mental modeling method and system collects or receives and stores unstructured data based on the goal or mission of the mental modeling. The unstructured data (or unstructured information) comprises information that either does not have a pre-defined data model or is not organized in a pre-defined manner. Unstructured information is typically text-heavy, but may comprise dates, numbers, and facts. This results in irregularities and ambiguities that make the unstructured information difficult to understand using traditional computer programs as compared to data stored in fielded form in databases or annotated (semantically tagged) in documents. The unstructured data includes literature, news, interviews, etc. For mental modeling purposes, unstructured data is collected through first, secondary research including collection of texts, sound files, videos, email files, and web page review, and later complemented by data produced through elicitations, e.g., interviews, which are mined by the mental modeling research function or component using automatic text and data mining techniques to reveal and map patterns of concepts that represent base or first order mental models.

The unstructured data is coded to create structured data. For example, the unstructured data is sorted or "tagged" with appropriate codes to enable machine analyses. The structured data includes surveys, databases, models, etc. The coding comprises applying tags (codes) to the unstructured data based on a coding guide. The coding guide may be based on an interview protocol, and the interview protocol may be based on the expert model. The expert model provides information about answers which should be obtained and about questions which should be asked. The software implementation enables importing expert model items as codes and then exporting coding results back to the expert model to modify items, e.g., highlight items, etc. A process including developing the interview protocol and the coding guide may be performed by the software module. For example, a visual tool may provide visual development of survey templates, short notes, etc. The tags comprise codes including short strings of letter and number combinations prepared by an expert coder. A coder may create question codes in a code library that are automatically applied to a document when the document is imported. By applying tags to the data based on the coding guide, the analyst is not required to interpret or make a judgment about the data, but merely to enable machine sorting and sifting of the data. Accordingly, bias from analysts is not imparted to the coded data and resulting mental models.

A coding module, e.g., in the cCASS software, is configured to automatically code documents. The coding module creates a library of key terms or codes in the cCASS code library. The coding module imports one or more documents, e.g., in the .txt format, opens the one or more documents, and tags instances of the codes, terms, and/or phrases that appear in the document. For example, the coding module compares each word or phrase from the document with each word or phrase from a name and description of each code. The corresponding tag is added to the sentence if a match word or phrase is determined by the coding module. The coding module may use a blacklist (e.g., ignore words from /cCASS/data/blacklist) and the English morphology (e.g., removing stems of words) to compare words/phrases in the coding library to words/phrases in the one or more documents. Accordingly, the unstructured data may be coded by the coding module or by an analyst, or by a combination of the coding module and the analyst.

Figure 2A:
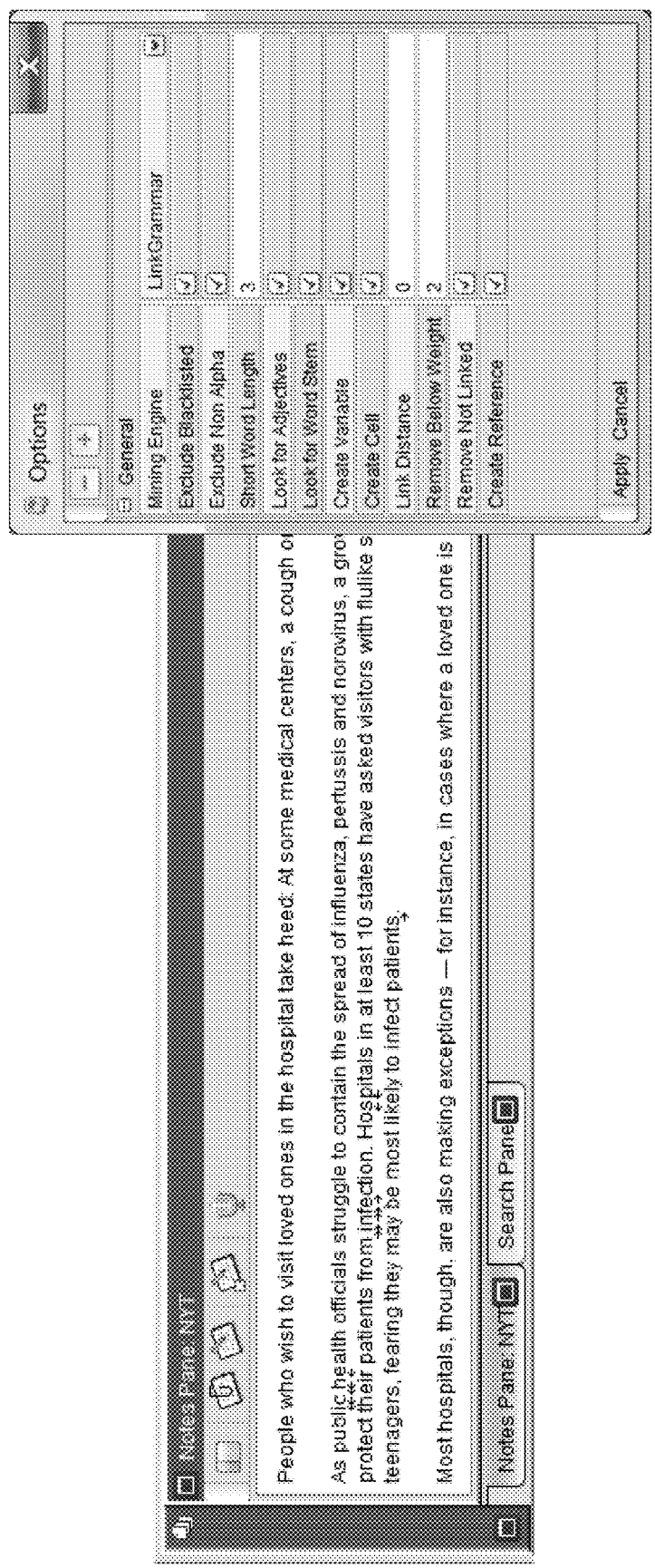
FIG. 2A illustrates an example data mining process.
Figure 2A:
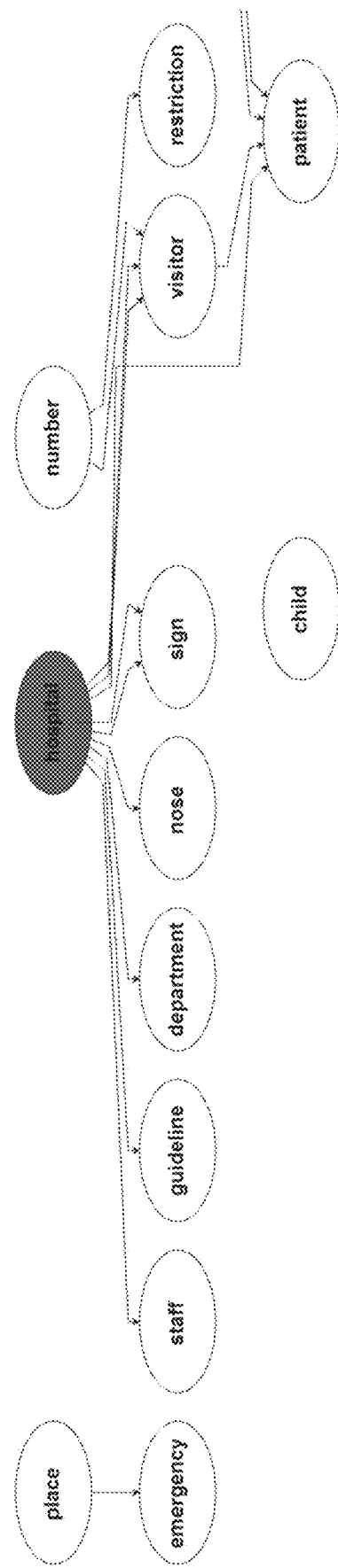
Figure 2B:
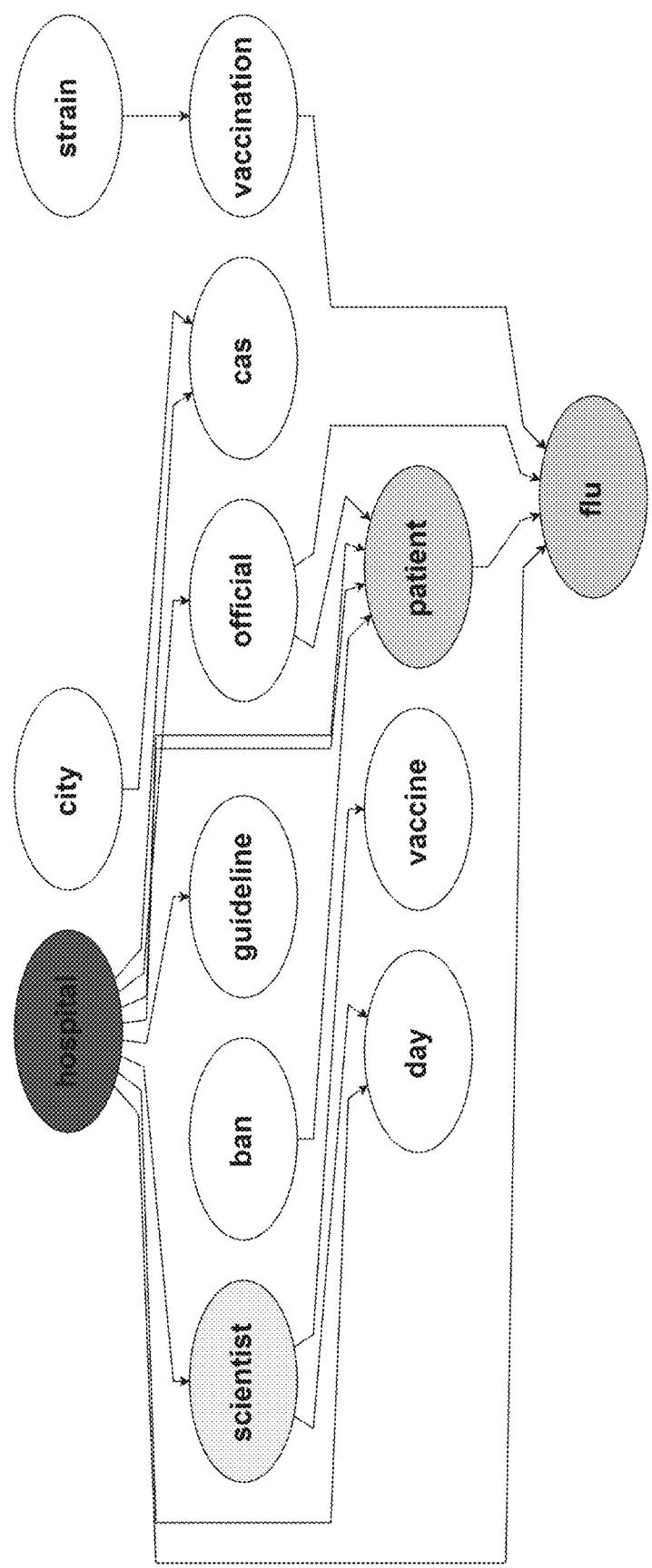
FIG. 2B illustrates an example concept map.

FIG. 2A illustrates an example data mining process, and FIG. 2B illustrates an example concept map. The unstructured data and/or the structured data is data mined based on pre-set algorithms comprising a data mining function in the CASS software to automatically create one or more concept maps. The concept maps may be refined by an analyst to highlight primary signals in the data and reduce or eliminate noise in the data by ignoring certain words, variables, relationships, etc. If multiple concept maps are created, the multiple concept maps may be combined to create a summary concept map. The multiple concept maps may be combined in different ways, for example, a concept map with differences between combined models may be created. The concept map is created based on the unstructured data, the structured data and the goal/mission of the mental modeling method.

Data Mining is integrated into the expert and mental modeling function or component and is performed to gather information from text, web, social media, and other information sources. The gathered information may be used to structure expert and mental modeling problems, or to assess the components of expert models and mental models. For text mining, at least four different customizable text mining engines (linguistic and statistics tools) may be used depending on text quality and volume. More text mining engines and tools can be implemented if needed. News articles or any other text can be used as a source text for text mining. For example, for news article style texts, more sophisticated and accurate text mining engines can be used. Different options can be used to gather required information using text mining. For example, some options can be used to get rid of unwanted concepts and relationships. Depending on selected options concept maps, variables, relationships, and/or references can be generated.

Similar to text mining, web and social media mining tools may be used to gather information and create expert models and mental models, and variables, relationships, and concept maps can be generated from the mined data.

Generated concept maps may be cleaned up by combining similar concepts, and removing unwanted ones. Concept maps may be combined together in different ways. For example, a summary map can be automatically generated by combining all generated concept maps. FIG. 2B shows an example summary concept map that was created by combining two different concept maps which were generated by data mining the text of two newspaper articles. An expert model may be a cleaned and refined concept model. An analyst and/or an expert may modify a concept model based on his or her expertise and knowledge to create an expert model. The mental modeling method and system may improve variable and relationship models to provide more and more cleaned, refined, and meaningful concept models with each step of data mining and/or with each use of set/graph theory operations. For example, an analyst or expert improves variable and relationship model libraries by indicating which variables or relationships should be treated similarly and which variables and relationships should be ignored to develop a simple ontology of the considered problem. The expert model is iteratively generated based on the variable and relationship model libraries with each step of data mining and/or with each use of set/graph theory operations. This ontology based training may perform an automated transition from concept models to an expert model.

Figure 3A:
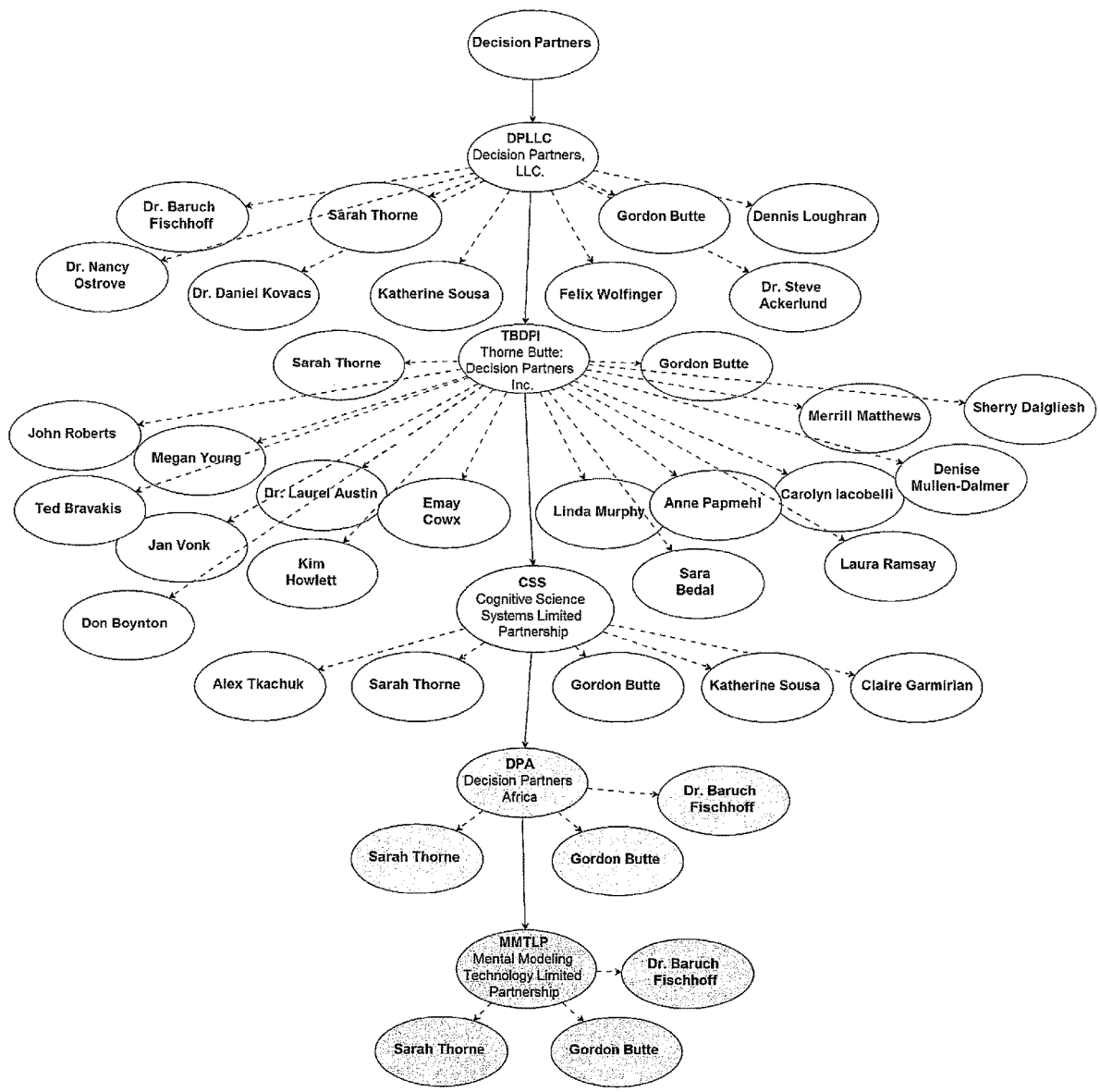
FIG. 3A illustrates an example stakeholder tree.
Figure 3B:
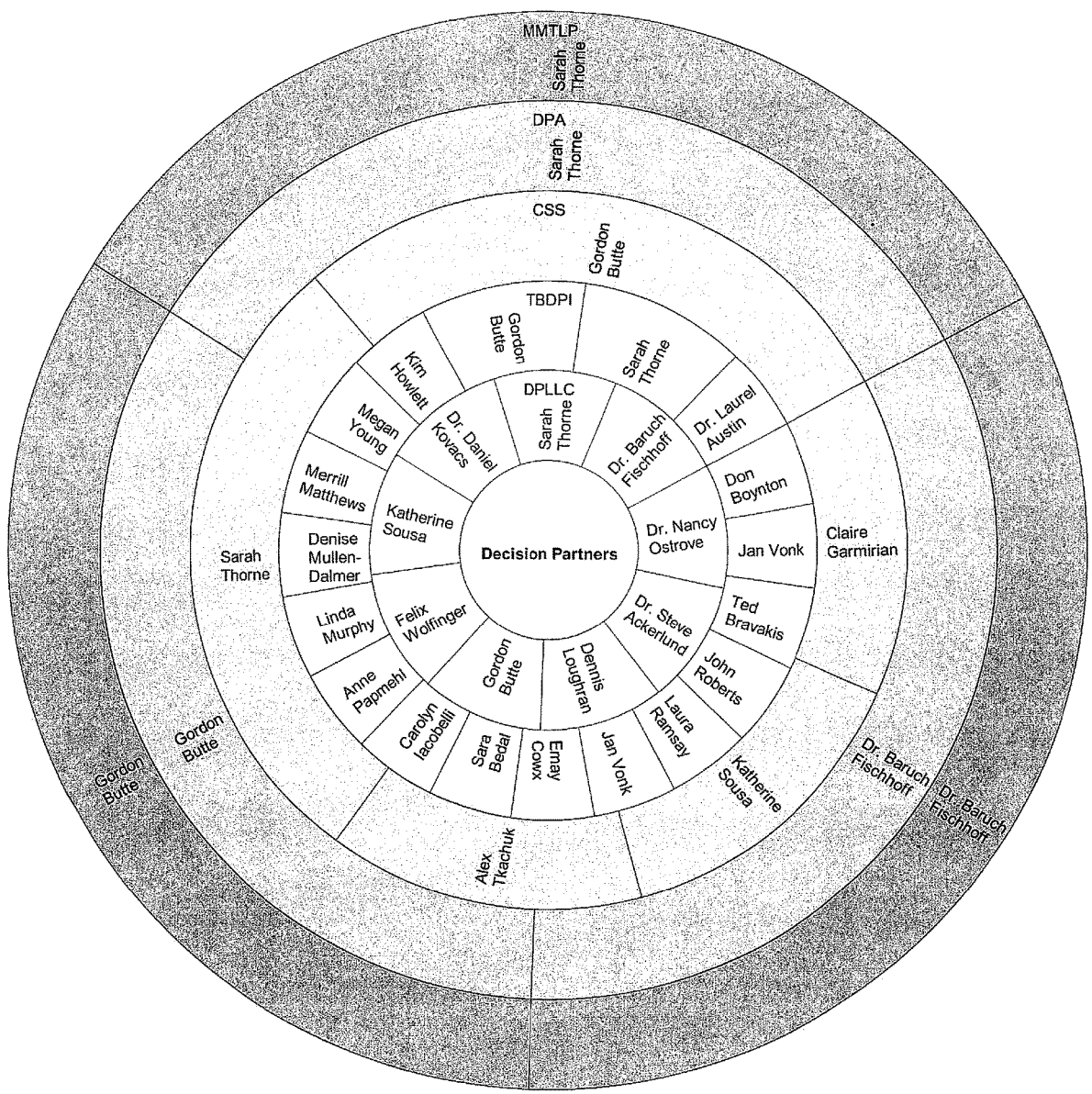
FIG. 3B illustrates an example stakeholder map.

FIG. 3A illustrates an example stakeholder tree. FIG. 3B illustrates an example stakeholder map. A stakeholder map maps entities associated with the topic of the mental model research. The expert model and other models may be linked to the stakeholder map such that a user of the system can click through the stakeholder maps or the expert model to view relationships. Although data mining is used to generate new concept maps, stakeholder maps are used to visualize existing concept maps. A certain kind of concept map, a stakeholder tree, may be created based on the data mining to automatically generate a radial tree map, i.e., the stakeholder map. The process treats some concepts as stakeholder groups and others as individual stakeholders to generate the stakeholder map. Relationships between concepts are used to place stakeholder groups and stakeholders into the stakeholder map. The example stakeholder tree as shown in FIG. 3A may be used to create the example stakeholder map shown in FIG. 3B. By clicking on a node in the stakeholder tree or on a wedge in the stakeholder map, a user is taken to a model that was linked to the particular stakeholder.

FIG. 4 illustrates an example expert model. An initial or base expert model is created by an analyst from relevant secondary research and automatic data mining of some or all of the unstructured data collected in the secondary research process. The base model is a limited and simplified first version, or first order rendering, of an expert model from the relevant data. The base model is typically iterated with various relevant subject matter experts. From the base model, an analyst prepares a protocol (e.g., semi-structured questionnaire) to use in order to elicit more information about the model from relevant experts. That information is used by the analyst to modify the base model as appropriate. An expert model, which is created and validated through one or more iterations with experts, is used as the basis for developing the mental models interview guide or protocol and the library of codes for enabling analysis of interview results/data.

In a mental modeling method and system according to a preferred and non-limiting embodiment, relevant structured data, relevant unstructured data, and the one or more concept maps are analyzed to produce the initial or base expert model. The base expert model typically shows how relevant subject matter experts understand the topic/problem and its specific issues, operations and opportunities. Target or sample groups of relevant non-experts (who are the focus of communications) are prepared. Individual mental models of the members of the sample groups are elicited through one-on-one interviews. Individual interview results (verbatim text) are coded using a library of codes prepared by an expert coder. The analysis comprises filtering the coded data using tags/codes, Boolean search, etc. The analysis may create a variety of reports including a word cloud, a code cloud, a keyword cloud, etc.

Figure 5:
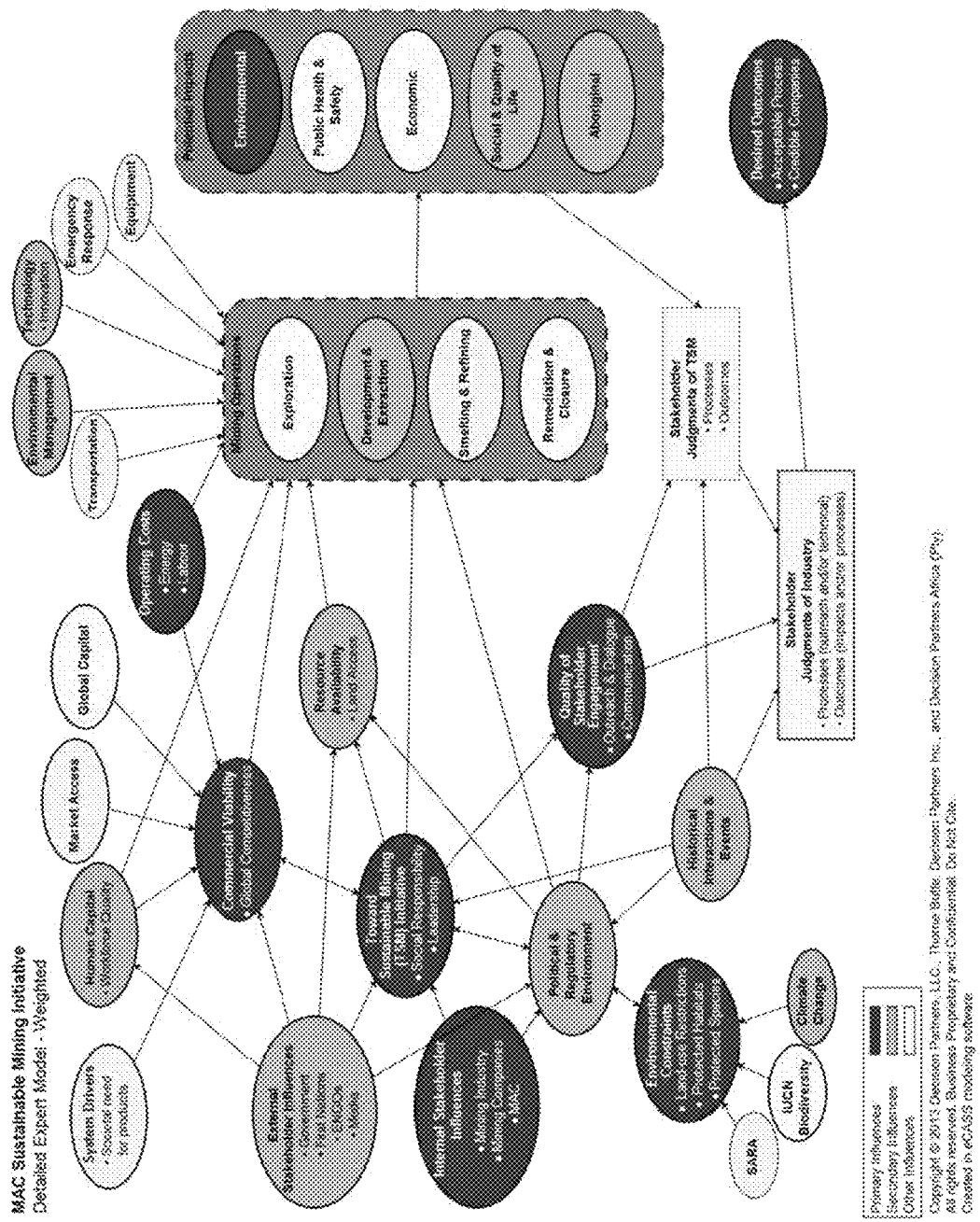
FIG. 5 illustrates an example updated expert model that has been modified based on one or more mental models.
Figure 6:
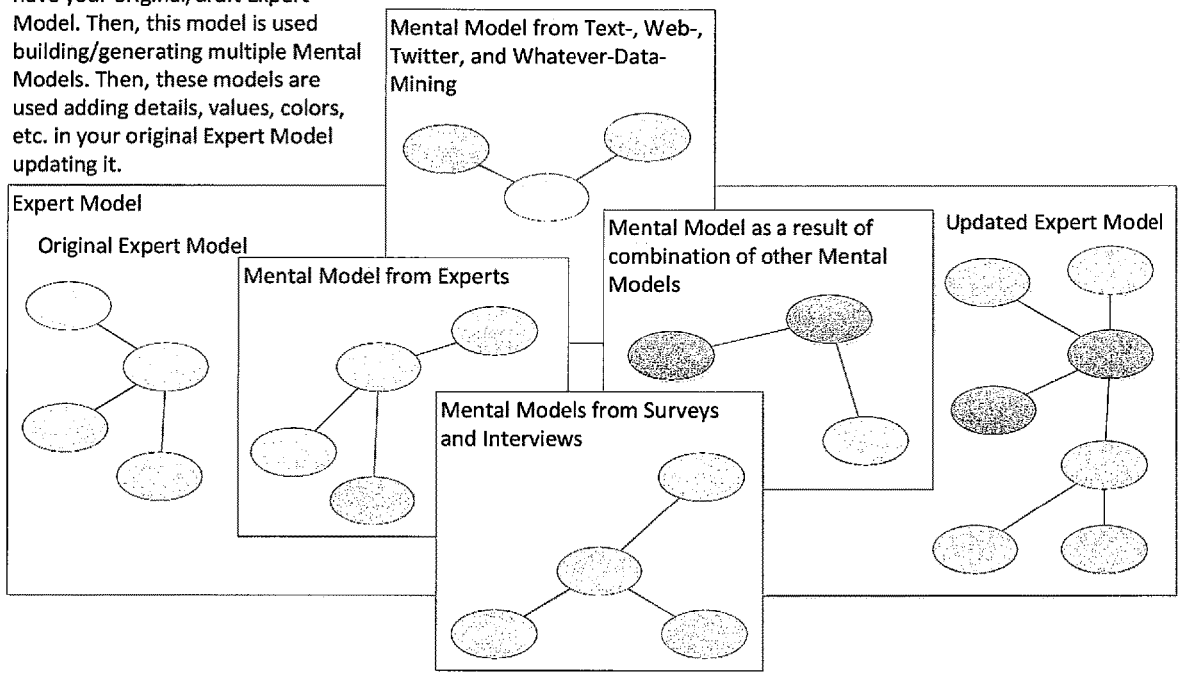
FIG. 6 illustrates an example expert model modified by multiple mental models to generate an updated expert model.
Figure 7:
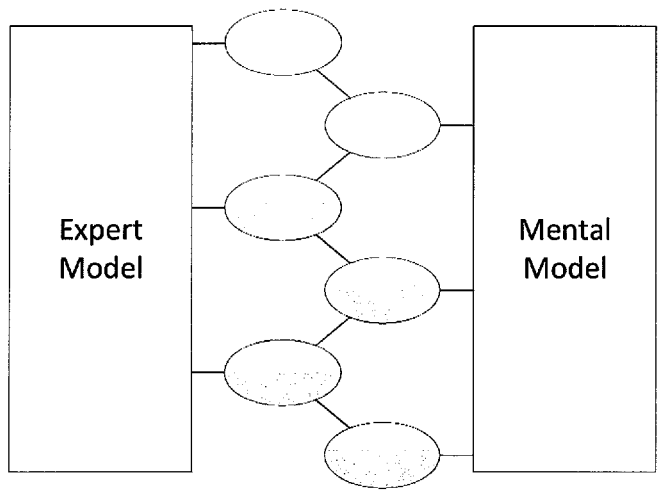
FIG. 7 illustrates linking between an example expert model and an example mental model according to a preferred and non-limiting embodiment.

FIG. 5 illustrates an example updated expert model that has been modified based on one or more mental models. FIG. 6 illustrates an example expert model modified by multiple mental models to generate an updated expert model. An expert model may be an influence diagram that represents and comprises expert-level knowledge on a particular topic. FIG. 7 illustrates between an example expert model and an example mental model according to a preferred and non-limiting embodiment. For example, analyses of various categories of coded mental models data are performed automatically and semi-automatically. The categories of data are illustrated as nodes (circles) between the expert model function and mental models data inventory. Links from the nodes to the rectangles illustrate data sorting, analysis, and mapping functions.

Mental models are natural phenomena. All people have mental models of one topic or another and use them to learn, make judgments and decisions and act on both. A mental model can be displayed or illustrated in many ways. FIG. 6 illustrates example mental models Visualized as colorized versions of an influence diagram. However, preferred embodiments are not limited thereto, and decision trees and other illustrative techniques may be used to describe and visualize mental models.

Figure 8:
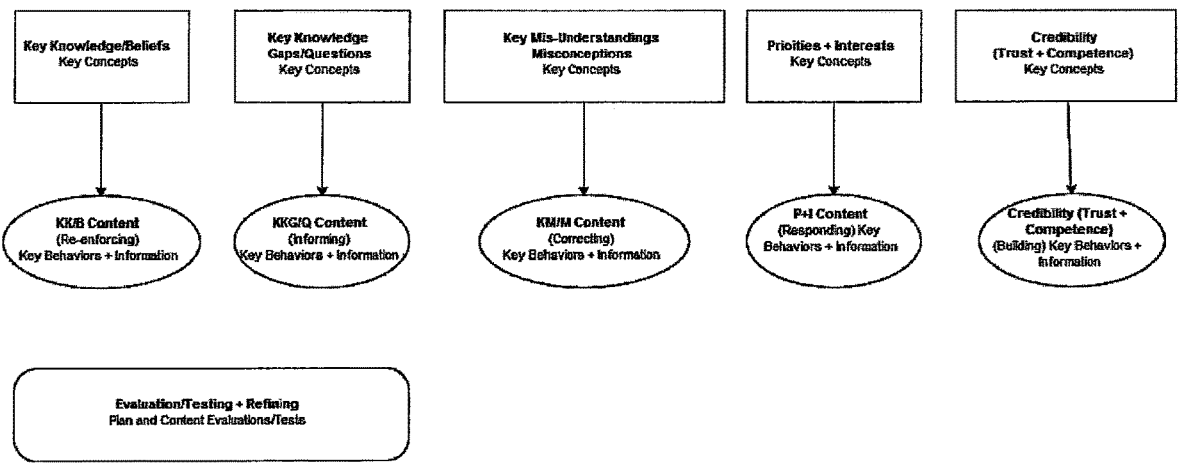
FIG. 8 is a flow chart showing a process for mental models communications planning and evaluation.

FIG. 8 is a flow chart showing a process for mental models communications planning and evaluation. Each individual's mental model may be determined based on and comprise a knowledge/current understanding component, a knowledge gaps (consequential) component, a misunderstandings (consequential) component, a priorities component, and a trust and competence criteria component.

The knowledge/current understanding component addresses what people know/understand as correct. The knowledge/current understanding component is determined based on current knowledge and understanding, information people may have/know now but is important to having a complete and correct mental model, and that they may have forgotten. The knowledge/current understanding component may comprise visuals, images (e.g., of physical/tangible objects, facilities, etc.), stories, scripts, narrative (in particular if processes must be understood), analogies, comparisons, examples or sets of similar mental models, precise or controlled vocabulary (in particular if unfamiliar, jargon or technical terms are required for understanding), beliefs and underlying rationale, assumptions, facts, numbers, behaviors, and demonstrations.

The knowledge gaps component addresses what people seem not to know (gaps) but that is consequential for decisions and behavior. The knowledge gaps component is determined based on filling the consequential knowledge including information that is relevant and useful for decision making but that people do not currently know. The knowledge gaps component may comprise visuals, images (e.g., of physical/tangible objects, facilities, etc.), stories, scripts, narrative (in particular if particular processes must be understood), analogies, examples or sets of similar mental models, precise or controlled vocabulary (especially if unfamiliar, jargon or technical terms are required for understanding), beliefs and underlying rationale, assumptions, facts, numbers, behaviors, and demonstrations.

The misunderstandings component addresses what people seem to misunderstand (misconceptions), in particular cause-and-effect relationships. The misunderstandings component is determined based on resolving misconceptions and myths that are consequential including information that is relevant and useful for decision making and that corrects important errors in understanding. The misunderstanding component may comprise visuals, images (e.g., of physical/tangible objects, facilities, etc.), stories, scripts, narrative (in particular if certain processes must be understood), analogies, examples or sets of similar mental models, precise or controlled vocabulary (in particular if unfamiliar, jargon or technical terms are required for understanding), beliefs and underlying rationale, assumptions, facts, numbers, behaviors, and demonstrations.

The priorities component addresses what people have noted are interests or priorities for communications and action. The priorities component is determined based on topics or issues people/stakeholders have indicated are important to understand and information that is relevant and useful for decision making and that can be linked directly to an expressed interest, priority or need of stakeholders. The priorities component may comprise visuals, images (e.g., of physical/tangible objects, facilities, etc.), stories, scripts, narrative (in particular if particular processes must be understood), analogies, examples or sets of similar mental models, precise or controlled vocabulary (in particular if unfamiliar, jargon or technical terms are required for understanding), beliefs and underlying rationale, assumptions, facts, numbers, behaviors, and demonstrations.

The trust and competence criteria component addresses factors influencing people's judgment of the trustworthiness and competence (credibility) of communications sources and communications themselves. The trust and competence criteria component is determined based on a judgment of credibility including perceived trustworthiness and perceived competence and information that matches/responds to credibility criteria identified in mental models research. The trust and competence criteria component may comprise behaviors, demonstrations, clear/demonstrated commitment: "homework", demonstration of listening and empathy, visuals, images (e.g., of physical/tangible objects, facilities, etc.), stories, scripts, narrative (e.g., personalized narrative), corrections, explanations and apologies for past errors/misunderstanding or failures, analogies, examples or sets of similar mental models, precise or controlled vocabulary (in particular if unfamiliar, jargon or technical terms are required for understanding), beliefs and underlying rationale, assumptions, facts, and numbers.

The models provided by a mental modeling method and system according to preferred and non-limiting embodiments are functional models. A user of the mental modeling system may operate the models. For example, a user may click through models to view other models or additional information linked to the model. The models may be computational. For example, an influence diagram may be modified to be computational. A navigation function or component enables a user of the mental modeling method and system to focus on certain aspects of the models, for example, to navigate through a model step-by-step. Each step may show only nodes of the model that are within "visible range" of the selected node. A default visibility range may be a one-node distance. If the visibility range is one node, only neighbor nodes directly connected to the selected node are shown. Clicking on a neighbor node displays that node's neighbors.

An expert model may be modified or influenced by the one or more mental models. For example, the expert model may be modified by painting with a heat map effect to visualize in two-dimensions an impact of mental models on the expert model. The expert model may be weighted with mental model data to reveal the pattern of people's thinking represented by one or more mental models. The modifications to the expert model based on the one or more mental models may structurally alter the expert model, e.g., add or remove model items, render the expert model three-dimensionally, and/or link the expert model to one or more mental models.

The updated expert model, which has been modified by the mental models as described above, is used to determine what must be communicated and how it should be communicated. For example, an analyst creates communication and performance factors based on the updated expert model. The created communications are used to inform decision making, change beliefs, and change behaviors.

The updated expert mental model is also used by analysts to determine how people address risk factors in their decision making. For example, the updated expert mental model is analyzed to determine decision and risk factors that influence decision making. The decision and risk factors include uncertainty, preferences, and risk.

Figure 9:
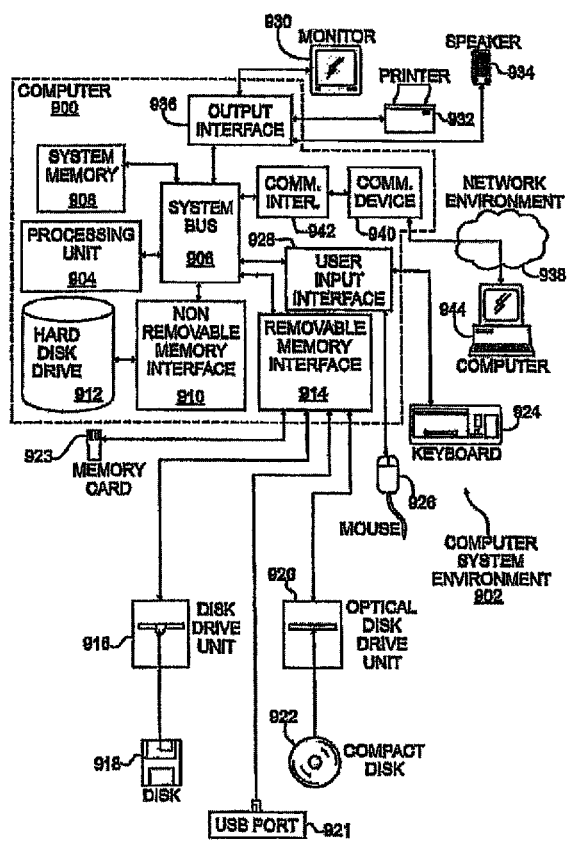
FIG. 9 illustrates a block diagram of a computer system according to principles of the present invention.

The present invention may be implemented on a variety of computing devices and systems, wherein these computing devices include the appropriate processing mechanisms and computer-readable media for storing and executing computer-readable instructions, such as programming instructions, code, and the like. As shown in FIG. 9, personal computers 900, 944 in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in a modulated data signal, such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media.

The computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data, and other instruction-based computer-readable codes.

With continued reference to FIG. 9, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 902, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 9 provide storage of operating systems, computer-readable instructions, application programs, data structures, program modules, program data, and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 902 to execute, configure, or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

It will be apparent to one skilled in the relevant art(s) that the system may utilize databases physically located on one or more computers which may or may not be the same as their respective servers. For example, programming software on computer 900 can control a database physically stored on a separate processor of the network or otherwise.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A mental modeling method, comprising:

providing, by a processor, at least one expert model, the at least one expert model comprising an analytical framework that summarizes subject matter expert-level knowledge;

providing, by the processor, at least one mental model of at least one individual that summarizes subject matter individual-level knowledge; and modifying, by the processor, the at least one expert model based on the at least one mental model to provide at least one updated expert model by embedding information and data from the at least one mental model within the at least one expert model in at least one multimedia representation, wherein a knowledge and understanding component of the at least one individual including images and text indicating information known by the at least one individual and a gap component of the at least one individual including images and text indicating information not known by the at least one individual are embedded from the at least one mental model within the at least one expert model in the at least one multimedia representation, and wherein the at least one multimedia representation of the updated expert model is provided via a user interface, wherein a misunderstandings component including images and text indicating information misunderstood by the at least one individual, a priorities component including images and text indicating a priority of information to the at least one individual, and a trust component including images and text indicating a credibility of a source of information to the at least one individual are further embedded from the at least one mental model within the at least one expert model in the at least one multimedia representation, and wherein the at least one expert model is modified based on the at least one mental model to structurally alter the at least one expert model to provide the at least one updated expert model in which an impact of the components embedded from at least one mental model is visualized in the at least one multimedia representation and the components from the at least one mental model are linked to the at least one expert model, wherein the at least one expert model, the at least one mental model, and the at least one updated expert model are linked such that, in response to a user clicking through one of the at least one expert model, the at least one mental model, and the at least one updated expert model, another one of the at least one expert model, the at least one mental model, and the at least one updated expert model is visualized in the at least one multimedia representation, and wherein clicking on a node of the at least one expert model, the at least one mental model, and the at least one updated expert model displays neighbor nodes to that node in the another one of the at least one expert model, the at least one mental model, and the at least one updated expert model.

2. The mental modeling method of claim 1, further comprising:

receiving, by the processor, unstructured data; providing, by the processor, at least one coding guide for coding the unstructured data to create structured data.

3. The mental modeling method of claim 2, further comprising:

data mining, by the processor, the unstructured data and/or the structured data based on at least one predetermined algorithm to automatically create at least one concept map.

4. The mental modeling method of claim 3, wherein the expert model is provided based at least partly on the unstructured data, the structured data, and the at least one concept map.

5. The mental modeling method of claim 3, further comprising:

analyzing, by the processor, the structured data to create the at least one mental model.

6. The mental modeling method of claim 1, wherein the updated expert model comprises at least one influence diagram.

7. The mental modeling method of claim 1, further comprising linking the at least one updated expert model with a plurality of different models.

8. A mental modeling system, the system comprising:

a computing device connected to at least one network, wherein the computing device is configured to:

acquire, from at least one input, unstructured data;

provide at least one expert model, the at least one expert model comprising an analytical framework that summarizes subject matter expert-level knowledge;

provide at least one mental model of at least one individual that summarizes subject matter individual-level knowledge; and modify the at least one expert model based on the at least one mental model to provide at least one updated expert model by embedding information and data from the at least one mental model within the at least one expert model in at least one multimedia representation, wherein a knowledge and understanding component of the at least one individual including images and text indicating information known by the at least one individual and a gap component of the at least one individual including images and text indicating information not known by the at least one individual are embedded from the at least one mental model within the at least one expert model in the at least one multimedia representation, and wherein the at least one multimedia representation of the updated expert model is provided via a user interface, wherein a misunderstandings component including images and text indicating information misunderstood by the at least one individual, a priorities component including images and text indicating a priority of information to the at least one individual, and a trust component including images and text indicating a credibility of a source of information to the at least one individual are further embedded from the at least one mental model within the at least one expert model in the at least one multimedia representation, and wherein the at least one expert model is modified based on the at least one mental model to structurally alter the at least one expert model to provide the at least one updated expert model in which an impact of the components embedded from at least one mental model is visualized in the at least one multimedia representation and the components from the at least one mental model are linked to the at least one expert model, wherein the at least one expert model, the at least one mental model, and the at least one updated expert model are linked such that, in response to a user clicking through one of the at least one expert model, the at least one mental model, and the at least one updated expert model, another one of the at least one expert model, the at least one mental model, and the at least one updated expert model is visualized in the at least one multimedia representation, and wherein clicking on a node of the at least one expert model, the at least one mental model, and the at least one updated expert model displays neighbor nodes to that node in the another one of the at least one expert model, the at least one mental model, and the at least one updated expert model.

9. The mental modeling system of claim 8, wherein the computing device is configured to provide at least one coding guide for coding the unstructured data to create structured data.

10. The mental modeling system of claim 9, wherein the computing device is configured to data mine the unstructured data and/or the structured data based on at least one predetermined algorithm to automatically create at least one concept map.

11. The mental modeling system of claim 10, wherein the expert model is provided based at least partly on the unstructured data, the structured data, and the at least one concept map.

12. The mental modeling system of claim 10, wherein the computing device is configured to analyze the structured data to create the at least one mental model.

13. The mental modeling system of claim 8, wherein the updated expert model comprises at least one influence diagram.

14. The mental modeling system of claim 8, wherein the computing device is configured to link the at least one updated expert model with a plurality of different models.

15. A computer program stored on a computer memory and executing on a processor which, when used on a computer apparatus causes the processor to execute steps of a mental modeling method, the method comprising:
providing at least one expert model, the at least one expert model comprising an analytical framework that summarizes subject matter expert-level knowledge;
providing at least one mental model of at least one individual that summarizes subject matter individual-level knowledge; and
modifying the at least one expert model based on the at least one mental model to provide at least one updated expert model by embedding information and data from the at least one mental model within the at least one expert model in at least one multimedia representation, wherein a knowledge and understanding component of the at least one individual including images and text indicating information known by the at least one individual and a gap component of the at least one individual including images and text indicating information not known by the at least one individual are embedded from the at least one mental model within the at least one expert model in the at least one multimedia representation, and wherein the at least one multimedia representation of the updated expert model is provided via a user interface,
wherein a misunderstandings component including images and text indicating information misunderstood by the at least one individual, a priorities component including images and text indicating a priority of information to the at least one individual, and a trust component including images and text indicating a credibility of a source of information to the at least one individual are further embedded from the at least one mental model within the at least one expert model in the at least one multimedia representation, and
wherein the at least one expert model is modified based on the at least one mental model to structurally alter the at least one expert model to provide the at least one updated expert model in which an impact of the components embedded from at least one mental model is visualized in the at least one multimedia representation and the components from the at least one mental model are linked to the at least one expert model,
wherein the at least one expert model, the at least one mental model, and the at least one updated expert model are linked such that, in response to a user clicking through one of the at least one expert model, the at least one mental model, and the at least one updated expert model, another one of the at least one expert model, the at least one mental model, and the at least one updated expert model is visualized in the at least one multimedia representation, and wherein clicking on a node of the at least one expert model, the at least one mental model, and the at least one updated expert model displays neighbor nodes to that node in the another one of the at least one expert model, the at least one mental model, and the at least one updated expert model.

16. The mental modeling method of claim 3, wherein the at least one concept map includes a plurality of concept maps, and wherein the plurality of concept maps are combined to create a summary concept map.

17. The mental modeling system of claim 10, wherein the at least one concept map includes a plurality of concept maps, and wherein the plurality of concept maps are combined to create a summary concept map.

* * * * *